US007720482B2

(12) United States Patent
Chaudry et al.

(10) Patent No.: US 7,720,482 B2
(45) Date of Patent: May 18, 2010

(54) METHOD AND APPARATUS FOR TRANSITIONING BETWEEN EVDO AND CDMA 1X SYSTEMS USING REDUNDANT DATA CALL BLOCKINGS

(75) Inventors: Shahid Rasul Chaudry, Ottawa (CA); Grace T. Y. Yeung, Kanata (CA); Asif Hossain, Ottawa (CA); Muhammad Khaledul Islam, Ottawa (CA); Kylie Dawn Pratt, Ottawa (CA)

(73) Assignee: Research In Motion Limited, Waterloo (CA)

( * ) Notice: Subject to any disclaimer, the term of this patent is extended or adjusted under 35 U.S.C. 154(b) by 376 days.

(21) Appl. No.: 11/263,069

(22) Filed: Oct. 31, 2005

(65) Prior Publication Data
US 2007/0121566 A1 May 31, 2007

(51) Int. Cl.
*H04Q 7/20* (2006.01)
(52) U.S. Cl. .................... 455/442; 455/452.1; 370/311; 370/329; 370/331; 370/332; 370/338; 709/249; 379/352
(58) Field of Classification Search .......... 370/342, 370/332, 352, 466, 311, 329; 455/442, 452.1; 709/249; 379/352
See application file for complete search history.

(56) References Cited

U.S. PATENT DOCUMENTS

| 7,212,832 | B2 | 5/2007 | Yokota |
| 7,299,046 | B1 | 11/2007 | Ozugur |
| 2003/0054822 | A1 | 3/2003 | Core et al. |
| 2004/0213182 | A1 | 10/2004 | Huh |
| 2005/0070293 | A1 | 3/2005 | Tsukiji |
| 2005/0096050 | A1 | 5/2005 | Hidaka |
| 2005/0096053 | A1 | 5/2005 | Liu et al. |
| 2005/0188113 | A1* | 8/2005 | Lee et al. ..................... 709/249 |
| 2006/0023683 | A1* | 2/2006 | Lee et al. ..................... 370/338 |
| 2006/0050680 | A1* | 3/2006 | Naim et al. .................. 370/352 |
| 2006/0109819 | A1* | 5/2006 | Marin et al. ................. 370/331 |
| 2006/0111114 | A1* | 5/2006 | Marin et al. ................. 455/442 |
| 2006/0111115 | A1* | 5/2006 | Marin et al. ................. 455/442 |
| 2006/0153134 | A1 | 7/2006 | Lee et al. |
| 2006/0203755 | A1* | 9/2006 | Kim ........................... 370/311 |
| 2007/0097923 | A1* | 5/2007 | Chaudry et al. ............. 370/332 |
| 2007/0098147 | A1* | 5/2007 | Chaudry et al. ............. 379/352 |
| 2007/0121566 | A1* | 5/2007 | Chaudry et al. ............. 370/342 |
| 2007/0140153 | A1* | 6/2007 | Kono .......................... 370/311 |
| 2007/0280264 | A1* | 12/2007 | Milton et al. ............ 370/395.31 |
| 2008/0075039 | A1* | 3/2008 | Srinivas et al. .............. 370/329 |
| 2008/0139215 | A1* | 6/2008 | Kim et al. ................. 455/452.1 |

FOREIGN PATENT DOCUMENTS

KR    1020070014852 A    1/2007

* cited by examiner

*Primary Examiner*—William D Cumming

(57) ABSTRACT

A method and apparatus of optimizing transitioning between EVDO and CDMA 1X systems in a hybrid access terminal, the method having the steps of preventing a reconnect data call from being sent from the hybrid access terminal. The preventing step including checking whether a transition between an EVDO and a CDMA 1X system is successful; and if not blocking the data call, and/or checking whether an EVDO received signal strength indication is greater than or equal to a receiver sensitivity on the hybrid access terminal; and if yes, allowing the hybrid access terminal to connect to the EVDO system, and/or delaying a connection timer for connecting to the EVDO system and/or applying fast dormancy to the hybrid access terminal in an EVDO state.

41 Claims, 14 Drawing Sheets ance. These criteria can
METHOD AND APPARATUS FOR TRANSITIONING BETWEEN EVDO AND CDMA 1X SYSTEMS USING REDUNDANT DATA CALL BLOCKINGS

FIELD OF THE APPLICATION

The present application relates to the optimization of a data device in a CDMA 1X/EVDO mobile system, and in particular to the reduction or elimination of unnecessary network calls from the hybrid access terminal.

BACKGROUND

A CDMA 1X/EVDO hybrid access terminal (mobile device) is a hybrid system that has evolved from the CDMA 2000 system. EVDO standards for Evolution Data Only or Data Optimized and, as suggested by this, is a data only system. Alternatively, EVDO is also known as High Rate Packet Data (HRPD). One advantage of EVDO systems is that they allow a higher transfer rate for data. They are also useful to carriers to clear the 1X system for more voice capacity by removing data traffic from the 1X system. The 1X system is also known in the art as 3G1X.

A hybrid access terminal operating in a 1X/EVDO hybrid mode will first acquire the CDMA 1X system and once this system has been acquired and the hybrid access terminal is in an idle stage, it will try to acquire an EVDO system. The CDMA 1X system will always have precedence over the EVDO system according to current design specification in terms of initial system acquisition. Once the 1x system is acquired, a hybrid access terminal starts periodic monitoring for the availability of any EV-DO systems as EVDO system is more preferred for packet data service and the fact that EVDO system also provides the capability to receive an incoming voice call even during active packet data session which is not possible on 1x system.

On transition from a CDMA 1X system to an EVDO system, or vice versa, a hybrid access terminal with a dormant packet data session initiates a data call to the new system. This is required so that the device connects the current data session with the new system upon transition as the wireless network may need to move the data context information associated with the hybrid access terminal from source to target network. This is also known as packet data "reconnect" process. This occurs when the device transitions from the EVDO system to the 1X system, or vice versa.

If for any reason the transition between and EVDO system and a 1X system fails, a problem exists with redundant data calls being made. For example, a problem exists in boundary areas where the EVDO system may be seen by the hybrid access terminal and the terminal attempts to make a transition due to preference of EVDO system over 1x system. During such transition attempts, EVDO system may not be able to be acquired, or may be acquired and quickly dropped due to signal strength variations or the hybrid access terminal moving into and out of the boundary area. The problem with this is that a data call is made if the hybrid access terminal fails to transition to the EVDO system and moves back to a 1X system. Since the network considers the device in the 1X system already, this data call is redundant and wastes mobile battery life and network resources.

SUMMARY

The present method and apparatus overcome the deficiencies of the prior art by preventing a redundant data call. Three solutions are presented herein and the solutions can be used individually or in combination with each other. Further, a method for optimizing battery life can be used in combination with any of the above solutions, alone or in combination with each other.

The first solution is to block the redundant data call. This is done if an unsuccessful attempt is made to connect to an EVDO or a 1X system and the hybrid access terminal moves back to its previous system. In this case, the hybrid access terminal can check whether or not the new system was acquired successfully and if not, the data call can be blocked in this case.

Alternatively, transition criteria can be set which prevents connection to an EVDO system unless the threshold is exceeded. Alternatively, other criteria could be used to reduce the probability of unsuccessful connection. These criteria can include EVDO signal strength should exceed a threshold for a certain time duration. Other criteria are possible. For example, the radio sensitivity of the hybrid access terminal could be the threshold, and the EVDO received signal strength indication must be greater than or equal to the receiver sensitivity.

A third solution is to monitor the radio frequency environment and connect only when the radio frequency environment is conducive to the connection. This last solution varies the timer used for connection to the EVDO system, and the timer will only expire when the environment is conducive to the connection to the EVDO system.

Fast dormancy can be used with any of the above to save the battery life of the hybrid access terminal when connecting to an EVDO system or a 1X system. Fast dormancy allows a hybrid access terminal to release the packet data call in situation when it can determine that it is done with data exchange, but wireless network can not. By doing so, it can enter packet data dormant state faster and save battery life that would have been wasted by unnecessarily keeping the data call longer than required.

The above solutions can be used alone, or in combination with one another. For example, the transition criteria can be used as a first check, and an attempt to connect to the EVDO system can then be confirmed to be successful prior to sending out a data call. In this case, if the connection to the EVDO system is not successful then the data call can be blocked. Similarly, other solutions and combinations will be evident to those skilled in the art based on the teachings herein.

The present application therefore provides a method of optimizing transitioning between EVDO and CDMA 1X systems in a hybrid access terminal comprising the steps of: detecting a transition between CDMA 1X and EVDO; checking whether the transition between the CDMA 1X and EVDO system is successful; and if not blocking a reconnect data call from the hybrid access terminal.

The present application further provides a method of optimizing transitioning between EVDO and CDMA 1X systems in a hybrid access terminal comprising the steps of detecting an EVDO received signal at the hybrid access terminal; checking whether a signal strength indication of the EVDO received signal is greater than or equal to a threshold for a predetermined duration; and if yes allowing the hybrid access terminal to connect to the EVDO system.

The present application still further provides a method of optimizing transitioning between EVDO and CDMA 1X systems in a hybrid access terminal comprising the steps of detecting an EVDO received signal at the hybrid access terminal; and delaying a connection timer at the hybrid access terminal for connecting to the EVDO system.

The present application still further provides a hybrid access terminal adapted for optimizing transitioning between EVDO and CDMA 1X systems, the hybrid access terminal having a radio subsystem adapted to communicate with a network; a radio processor having a digital signal processor and adapted to interact with said radio subsystem; memory; a user interface; a processor adapted to run user applications and interact with the memory, the radio and the user interface and adapted to run applications, the hybrid access terminal characterized by having means for: detecting a transition between CDMA 1X and EVDO; checking whether the transition between the CDMA 1X and EVDO system is successful; and if not blocking a reconnect data call from the hybrid access terminal.

The present application still further provides a hybrid access terminal adapted for optimizing transitioning between EVDO and CDMA 1X systems, the hybrid access terminal having a radio subsystem adapted to communicate with a network; a radio processor having a digital signal processor and adapted to interact with said radio subsystem; memory; a user interface; a processor adapted to run user applications and interact with the memory, the radio and the user interface and adapted to run applications, the hybrid access terminal characterized by having means for: detecting an EVDO received signal at the hybrid access terminal; checking whether a signal strength indication of the EVDO received signal is greater than or equal to a threshold for a predetermined duration; and if yes allowing the hybrid access terminal to connect to the EVDO system.

The present application yet further provides a hybrid access terminal adapted for optimizing transitioning between EVDO and CDMA 1X systems, the hybrid access terminal having a radio subsystem adapted to communicate with a network; a radio processor having a digital signal processor and adapted to interact with said radio subsystem; memory; a user interface; a processor adapted to run user applications and interact with the memory, the radio and the user interface and adapted to run applications, the hybrid access terminal characterized by having means for: detecting an EVDO received signal at the hybrid access terminal; and delaying a connection timer at the hybrid access terminal for connecting to the EVDO system.

BRIEF DESCRIPTION OF THE DRAWINGS

The present method and apparatus will be better understood with reference to the drawings in which.

DETAILED DESCRIPTIONS

As will be appreciated by those skilled in the art, when a hybrid access terminal is on a boundary between networks, it can "ping pong" between these networks and needs to reacquire these systems continuously. This is both draining on battery life of the hybrid access terminal and can cause network resources to be used unnecessarily.

If the hybrid access terminal supports voice and packet data service, it operates in a CDMA 1X/EVDO hybrid system. In this system, the hybrid access terminal first acquires the CDMA 1X system, after which it tries to acquire an EVDO system. EVDO systems are preferable to the user of the hybrid access terminal since they have a higher data rate, and also to carriers since moving the data calls off of the CDMA 1X system frees up voice capacity on the 1X system. In addition, EVDO system also provides the capability to receive an incoming voice call even during active packet data session, which is not possible on 1x system.

As indicated above, when a hybrid access terminal is in an area close to a boundary for an EVDO system, the hybrid access terminal may continuously try to acquire the EVDO system because of its preference over 1x system. If the attempt to acquire the EVDO system is unsuccessful, the hybrid access terminal will move back into the 1X system. The problem with this is that devices typically are required to initiate a data call to reconnect its existing packet data session when they move between systems to tell the new system that the hybrid access terminal has transferred between either the 1X to the EVDO or from the EVDO to the 1X. However, in the event of an unsuccessful attempt, the device will typically move back to its former 1X state and not be required to reacquire the 1X system. Prior art systems have still made a redundant data call in this situation.

The sending of redundant data calls causes the battery to be drained more quickly on the hybrid access terminal and further causes network congestion. Also, while the device is sending a data call it is unable to receive voice traffic. Thus for a period when the hybrid access terminal moves to EVDO state unsuccessfully and then back into the 1X state it sends a data call with a dormancy period after the data call. During this data call and the dormancy period a voice call is unable to be sent to the hybrid access terminal and is automatically rerouted to the voice mail system.

The present application presents the solution of preventing the redundant data call. This can be done in various ways, and three solutions that can be used individually or in combination with each other are presented below.

Blocking the Redundant Data Call

Figure 1:
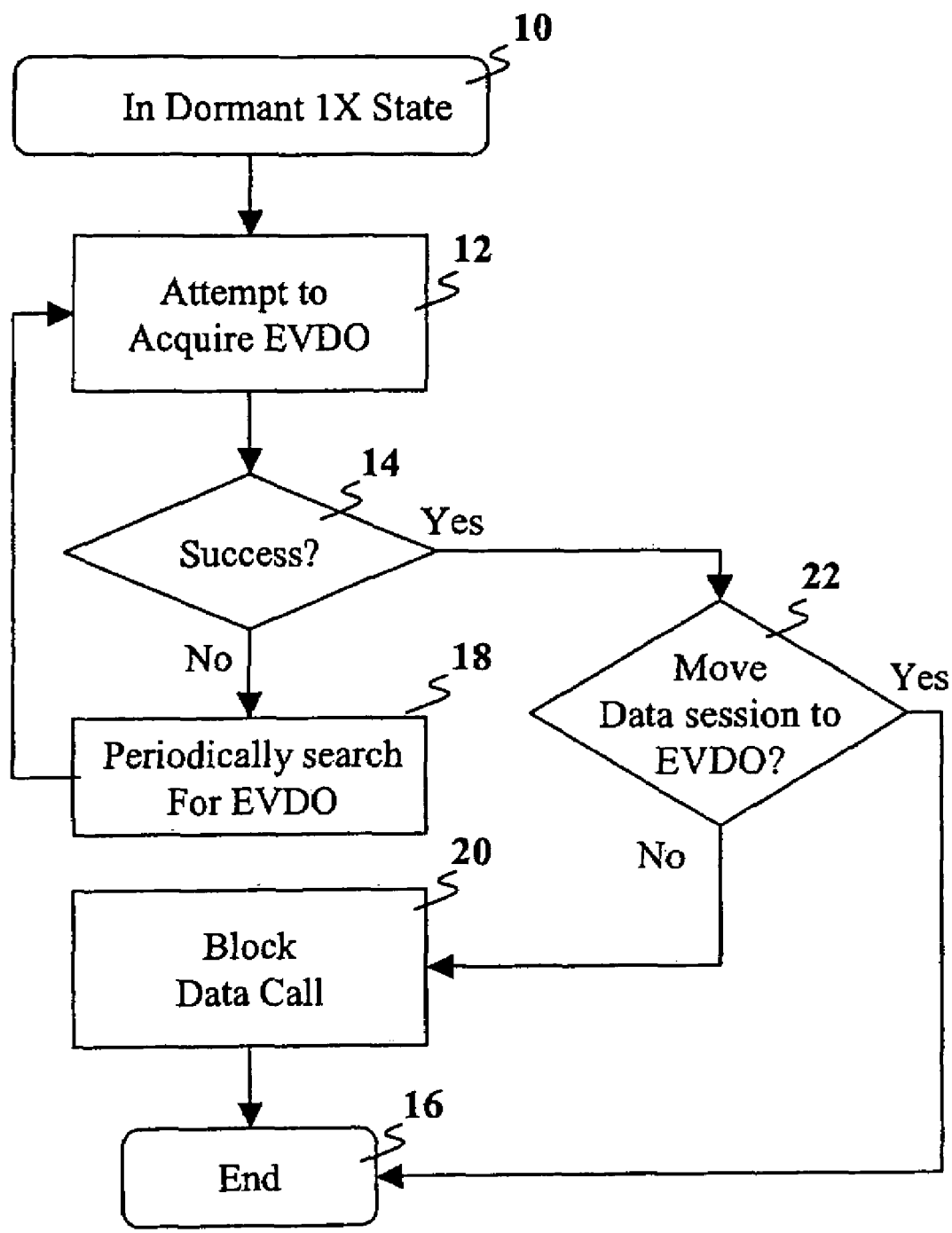
FIG. 1 is a flow chart of a method of avoiding redundant data calls according to one aspect of the present application.

Reference is now made to FIG. 1. If a hybrid access terminal in a dormant 1X state 10 detects an EVDO signal, the hybrid access terminal proceeds to step 12 in which it tries to acquire the EVDO system. As will be appreciated by those skilled in the art, it is preferable that the data device handle its data calls in the EVDO system, thus freeing up the 1X system for increased voice capacity. Further, the EVDO system provides higher bandwidth, which is preferable for the hybrid access terminal. Prior to transitioning, the hybrid access terminal should store the system identifier/network identifier/packet zone identifier (SID/NID/PZID) of the 1X system.

From step 12, the hybrid access terminal proceeds to step 14 in which it checks whether or not the EVDO system was successfully acquired. This could be if a successful point to point protocol (PPP) session is established with the new system. If the EVDO system was not successfully acquired the hybrid access terminal proceeds to step 18 in which the hybrid access terminal periodically searches for an EVDO system.

Conversely, if the EVDO acquire in step 12 was successful, the hybrid access terminal proceeds to step 22 in which it tries to move the data session to EVDO. If successful in step 22, the hybrid access terminal proceeds to step 16 and the process is ended.

If the hybrid access terminal is unsuccessful in step 22, the hybrid access terminal next proceeds to step 20 in which a redundant call is blocked. As will be appreciated by those skilled in the art, the redundant data call results from the hybrid access terminal moving from an EVDO state into a 1X state. In this case, since the EVDO state was only moved to in a failed attempt to acquire the EVDO system, the transitioning back to the 1X state does not require a data call, since the network currently thinks that the hybrid access terminal is accessing data over the 1X system. The method of FIG. 1 realizes that the data call in this case is redundant and thus in step 20 blocks it.

The hybrid access terminal next proceeds to step 16 in which the process is ended.

Figure 2:
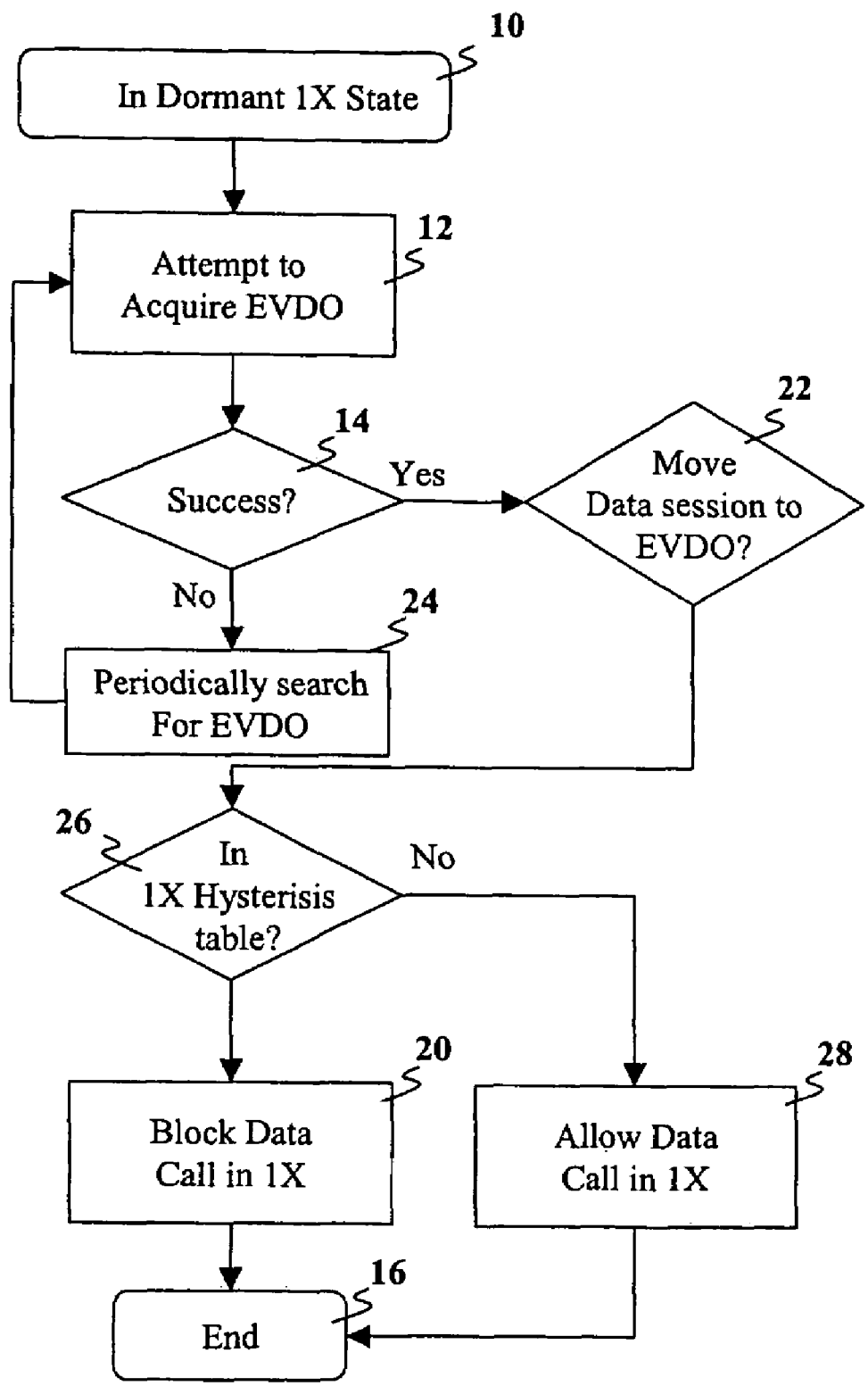
FIG. 2 is a flow chart of a method according to an aspect of the present application in which one of multiple 1X networks can be acquired.

Reference is now made to FIG. 2. Like reference numerals are used for similar steps to those in FIG. 1.

In some cases, the 1X system that is acquired if the EVDO attempt is unsuccessful may be different from the 1X system that was previously acquired. Specifically, in areas that are serviced by multiple networks or in boundary areas, a different 1X system may be acquired upon failure to acquire an EVDO system. In this case, a hysteresis table can be used to track recently accessed 1X systems and data calls can be blocked if the 1X system was recently acquired.

Referring to FIG. 2, the hybrid access terminal is in a 1X state and in step 12 tries to acquire to an EVDO system. In step 14 the hybrid access terminal checks whether or not the acquisition was successful and if it was, moves to step 22 where the it tries to move the data session.

Conversely, if the hybrid access terminal is unsuccessful in step 14 it proceeds to step 24 in which it periodically checks for an EVDO system.

If the data session transition in step 22 was unsuccessful, the hybrid access terminal proceeds to step 26. In step 26 the hybrid access terminal checks whether the 1X system exists in the hysteresis table. The hysteresis table will store systems that have been acquired within a predetermined time period from the current time. If the hybrid access terminal had accessed the 1X system within that time period, the data call will be redundant and thus the hybrid access terminal proceeds to step 20 in which the data call is blocked in 1X.

Conversely, the hybrid access terminal proceeds to step 28 from step 26 if the hysteresis table does not contain the 1X system. In step 28 the data call is allowed. As will be appreciated by those skilled in the art, step 28 can only be accessed if the hysteresis table does not find the 1X system acquired in step 24.

The hybrid access terminal next proceeds to step 16 in which the method is ended.

As will be appreciated, the SID/NID/PZID of the currently connected network can be used to check for successful acquiring of an EVDO data session. In one embodiment, the SID/NID/PZID should only be replaced in memory by the color code/Sector ID of the EVDO system once the PPP session is established successfully.

The above therefore illustrates various embodiments of a method for blocking redundant data calls in transitions between IX and EVDO when the hybrid access terminal fails to acquire one of the EVDO systems.

Signal Threshold

As an alternative to, or in addition to, the blocking of redundant calls, a further alternative according to the present apparatus and method is to ensure that an EVDO system is not acquired unless the received signal strength of EVDO system exceeds a predetermined threshold. As an alternative, the hybrid access terminal can also use its own receiver sensitivity as a threshold for received signal strength of EVDO system.

Figure 3:
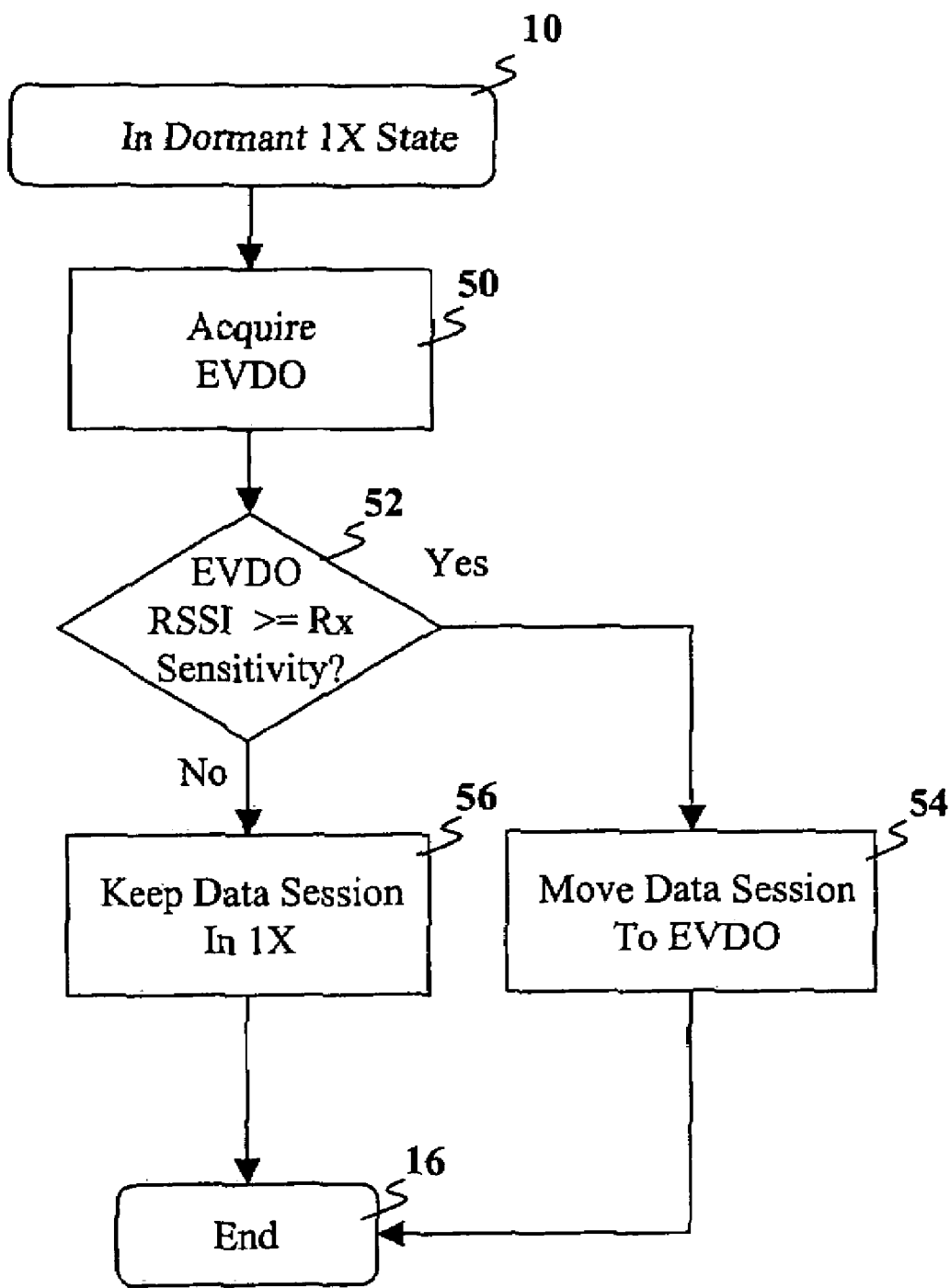
FIG. 3 is a flow chart of a method to avoid acquiring an EVDO system if certain preconditions are not met.

Reference is now made to FIG. 3. A hybrid access terminal is a dormant 1X state 10 and in step 50 acquires EVDO. The hybrid access terminal proceeds to step 52 in which it checks the EVDO received signal strength indication (RSSI) to see whether this is greater than a receiver sensitivity on the hybrid access terminal. If the EVDO RSSI is greater than or equal to the receiver sensitivity, then the hybrid access terminal proceeds to step 54 in which the EVDO data session can be moved to. Conversely, if in step 52 it is determined that the EVDO/RSSI is less than the receiver sensitivity, the hybrid access terminal proceeds to step 56 in which it will keep the data session in its 1X state.

From step 54 or step 56, the hybrid access terminal proceeds to step 16 in which the process is ended.

As will be appreciated from the above, the sending of redundant data calls is prevented in the above case by ensuring that the EVDO signal is greater than a certain threshold in order to ensure that the EVDO system can be successfully acquired the first time.

Check RF Environment

A further alternative is to monitor the radio frequency environment of the device to intelligently decide when to try to acquire an EVDO system.

Figure 6:
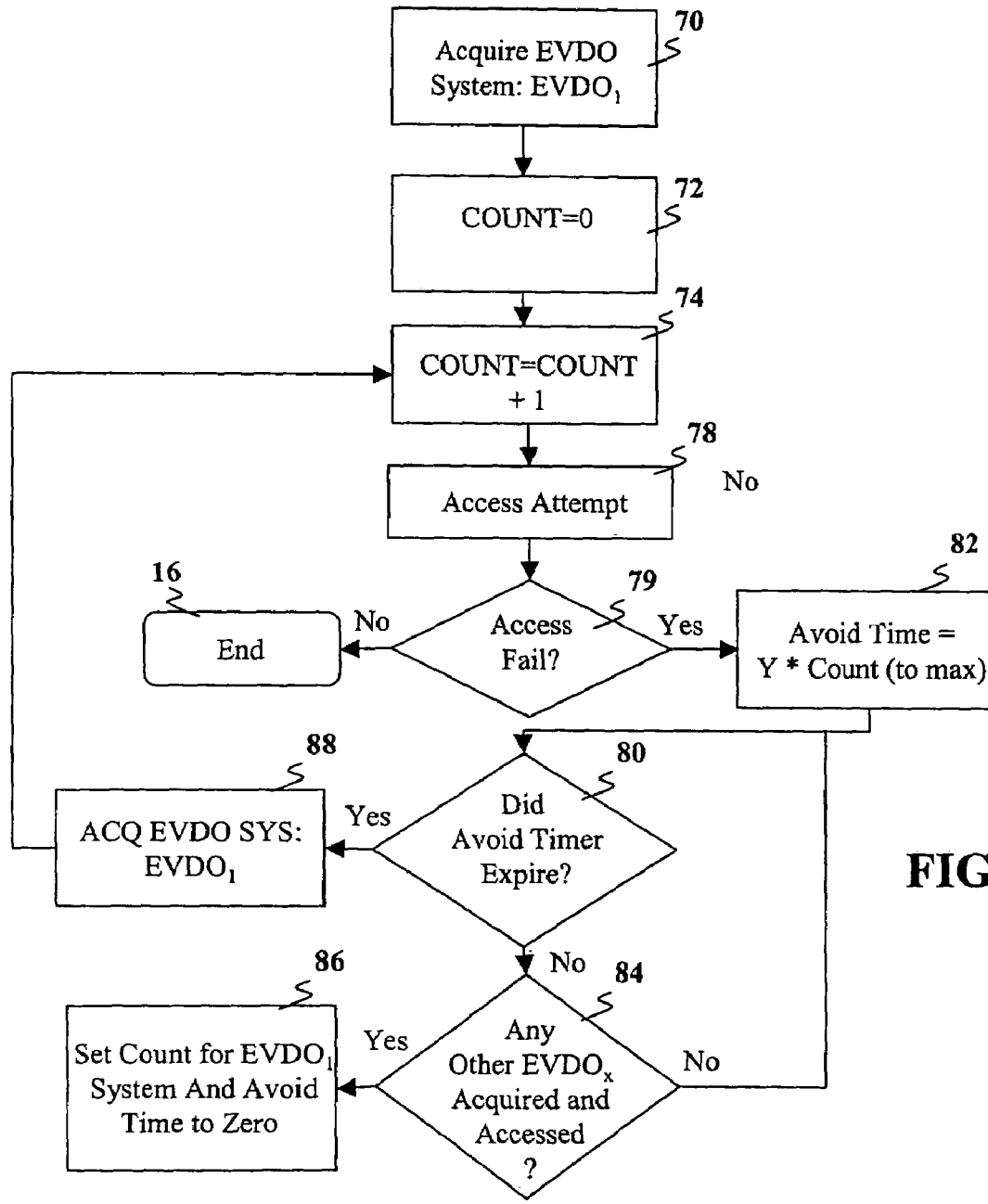
FIG. 6 is a flow chart of an alternative method for avoiding connecting to an EVDO system unless certain preconditions are met.

Reference is made to FIG. 6. FIG. 6 shows a method for addressing a situation where the forward link is good but an Access attempt is ailing due to a bad reverse link. As per the method of FIG. 6, a hybrid access terminal exponentially backs off trying to acquire the 'particular' EVDO System (that EVDO channel). During that AVOID period, the hybrid access terminal can try to acquire other EVDO Systems.

Anytime the hybrid access terminal is able to successfully acquire and access any other EVDO system, the AVOID time of the above is reset. Further, anytime an access attempt is successful in the system the hybrid access terminal was avoiding, the avoid time will be reset to zero Referring to FIG. 6, the hybrid access terminal in step 70 checks acquires a first EVDO system, labelled herein as $EVDO_1$. The hybrid access terminal proceeds to step 72 in which a count is set to zero and step 74 in which the count is incremented.

The hybrid access terminal proceeds from step 74 to step 78 in which an access attempt is made. In step 79 the hybrid access terminal checks whether the access failed. If not, the hybrid access terminal proceeds to step 16 and the process ends.

If the access is found to have failed in step 79, the mobile device proceeds to step 82 in which an avoid time is set. In the example of FIG. 6, the avoid time is set by multiplying a constant times the count. As will be appreciated, a maximum value for this can also be set.

In one embodiment, the constant can be set to a predetermined duration, such as 60 seconds. Thus for the first attempt the time is set to 60 seconds, for the second attempt the time is set to 120 seconds, and so on to the maximum time allowed.

From step 82 the hybrid access terminal proceeds to step 80 in which it checks whether the avoid timer has expired. If not, the hybrid access terminal proceeds to step 84 where it checks whether there are any other EVDO systems (EVDO$_x$) it can acquire and set a data session to.

In step 84, if the hybrid access terminal finds an EVDO system to connect to, it resets the count and avoid times for EVDO$_1$ in step 86. Otherwise step 84 loops back to step 80.

From step 80, if the avoid timer has expired the hybrid access terminal proceeds to step 88 and tries to acquire EVDO$_1$. The hybrid access terminal next proceeds back to step 74 and increments the counter.

An optional step with the above is to reduce or reset the EVDO reconnect delay if the system lost count is less than the maximum allowed. This is not shown in FIG. 6.

Figure 7:
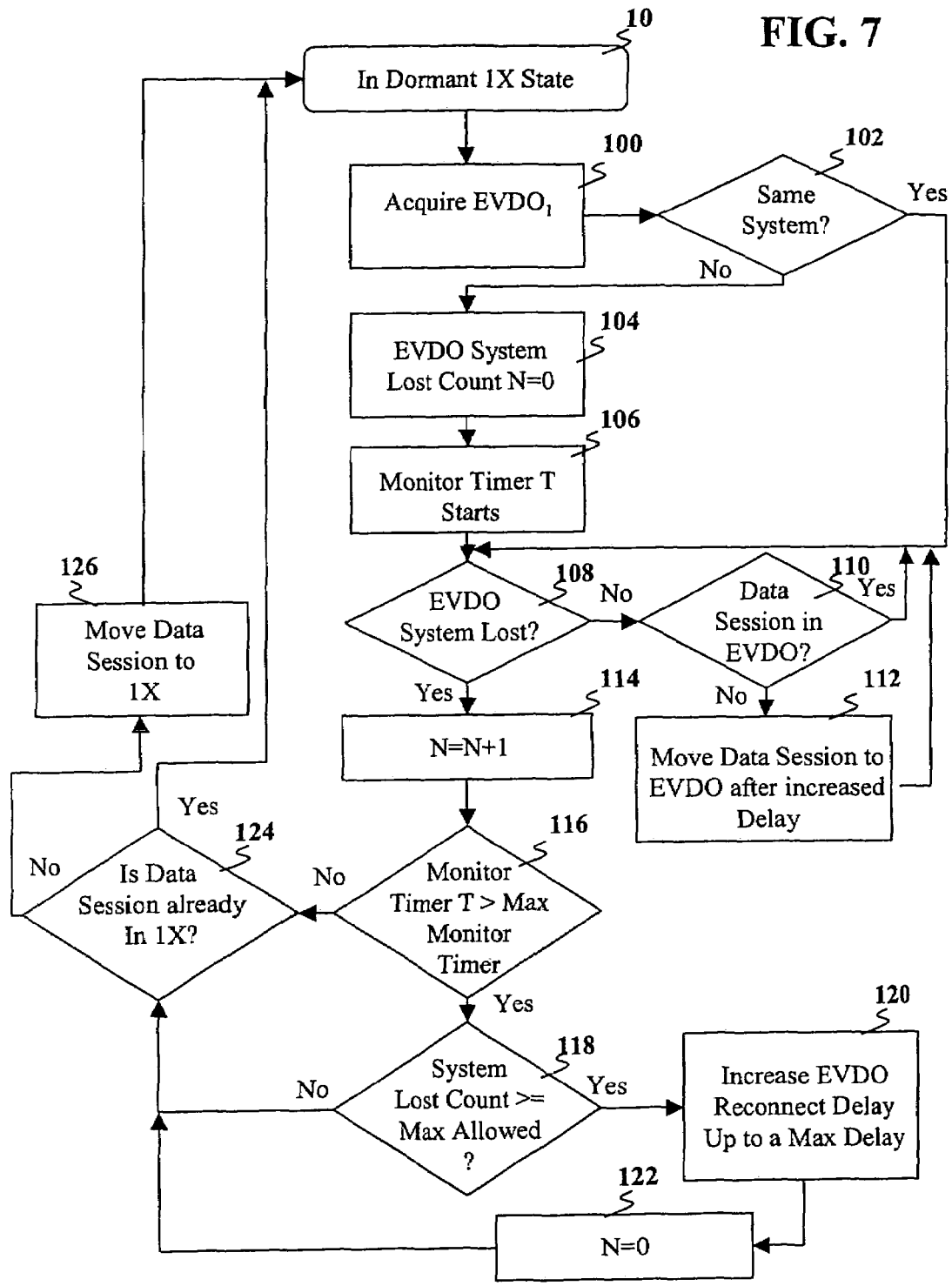
FIG. 7 is a flow chart of a further alternative method for avoiding connecting to an EVDO system unless certain preconditions are met.

Referring to FIG. 7, the method depicted therein addresses two issues: 1) if the forward link is bad in the acquired EVDO System or 2) EVDO coverage is spotty—i.e. sometimes a hybrid access terminal is successfully able to move a data session to EVDO but loses the EVDO system frequently during traffic session or even after being in idle in EVDO. The method of FIG. 7, upon the first time an EVDO system is acquired, starts a timer and a System Lost count. Upon expiry of the timer, the System loss count is checked to see if a 'Max System Loss Count' is reached. If the max did not reached, it the decision is made that current RF situation of the EVDO System is not as bad as predicted or previously observed, and therefore the timer and the System loss count is reset to zero.

On the other hand, if the System loss count is found to have reached the max System loss count within the monitoring period, then another parameter 'EVDO Data Reconnect Delay' is increased. In any subsequent occasion, if this EVDO System was acquired, before trying to move data session to this EVDO system, the hybrid access terminal will wait for the above delay before trying to reconnect. This 'EVDO Data reconnect Delay' is also exponentially increased as device keeps on staying in similar EVDO RF condition.

Reference is now made to FIG. 7. The hybrid access terminal starts in a dormant 1X state 10. The hybrid access terminal proceeds to step 100 in which it attempts to acquire an EVDO system, labelled herein as EVDO$_1$. The hybrid access terminal next proceeds to step 102 in which it checks whether the EVDO system is the same system as previously acquired.

If not, the hybrid access terminal proceeds to step 104 in which the EVDO System Lost Count N is set to 0 and step 106 in which Monitor Timer T is started.

From step 106 the hybrid access terminal proceeds to step 108 in which a check is made to see if the EVDO system is lost. Alternatively, step 108 can also be accessed from step 102 if the same system has previously been acquired.

If the hybrid access terminal finds in step that the EVDO system has not been lost the hybrid access terminal proceeds to step 110 in which it checks whether the data session is in EVDO. If not the hybrid access terminal proceeds to step 112 and the data session is moved. If yes, or from step 112, the hybrid access terminal proceeds back to step 108.

If the hybrid access terminal finds that the EVDO system was lost in step 108, it proceeds to step 114 in which the loss count is incremented. The hybrid access terminal next proceeds to step 116 in which it checks whether the monitor timer is greater than a maximum monitor timer. If it is, then the hybrid access terminal proceeds to check how many system losses occurred during the timer period. In step 118 if the system loss count is greater than a maximum allowed, the EVDO reconnect delay is increased incrementally, up to a maximum value in step 120. Further, the system loss count is reset in step 122 to start again.

If in step 116 the monitor timer is less than a maximum, or if in step 118 the loss count is less than the maximum allowed, the hybrid access terminal proceeds to step 124 in which it checks whether the data session is already in 1X. It will be appreciated that this check avoids redundant data calls from being made.

If in step 124 a data session is not in 1X the hybrid access terminal proceeds to step 126 to move the data session into 1X Subsequently the hybrid access terminal proceeds to a dormant 1X state 10. Step 124 can also proceed directly to dormant 1X state 10 if the data session is already in 1X.

The above therefore ensures that the environment is in a state that is conducive to a successful EVDO connection.

Fast Dormancy

Figure 4:
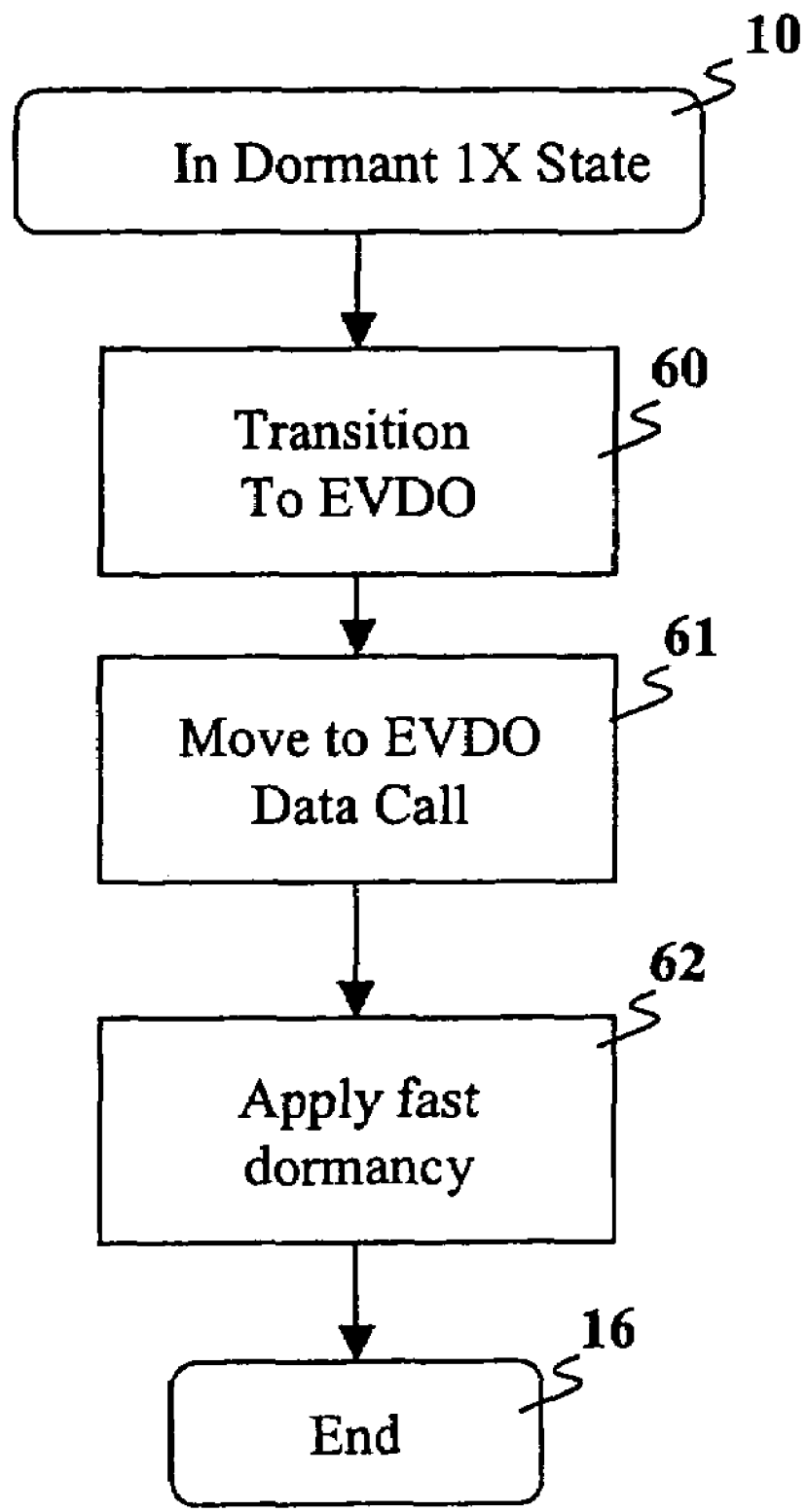
FIG. 4 is a flow chart of method to improve battery life on a hybrid access terminal that has transitioned to an EVDO state.

Reference is now made to FIG. 4. In traditional systems, when transitioning to an EVDO system, the data call terminating will cause the EVDO to move to a dormant state. This usually is done according to a preset time value, for example, 20 seconds. Fast dormancy causes the EVDO system to move into its dormant state more quickly. The battery life of the hybrid access terminal is improved by moving into a dormant state more quickly since the data channel does not need to be kept active. An optimal timer value for moving into a dormant state can be set based on statistical analysis.

As will be appreciated, the method of FIG. 4 does not reduce redundant calls but it saves the battery life on the hybrid access terminal.

Referring to FIG. 4, a hybrid access terminal is a dormant 1X state 10 and in step 60 it transitions to EVDO. In step 61 the hybrid access terminal moves the data session to EVDO.

Once the transition occurs and the data call is ended the hybrid access terminal proceeds to step 62 in which fast dormancy is applied. Thus the hybrid access terminal moves more quickly into its dormant state in step 62.

The hybrid access terminal next moves to step 16 in which the process ends.

Figure 5:
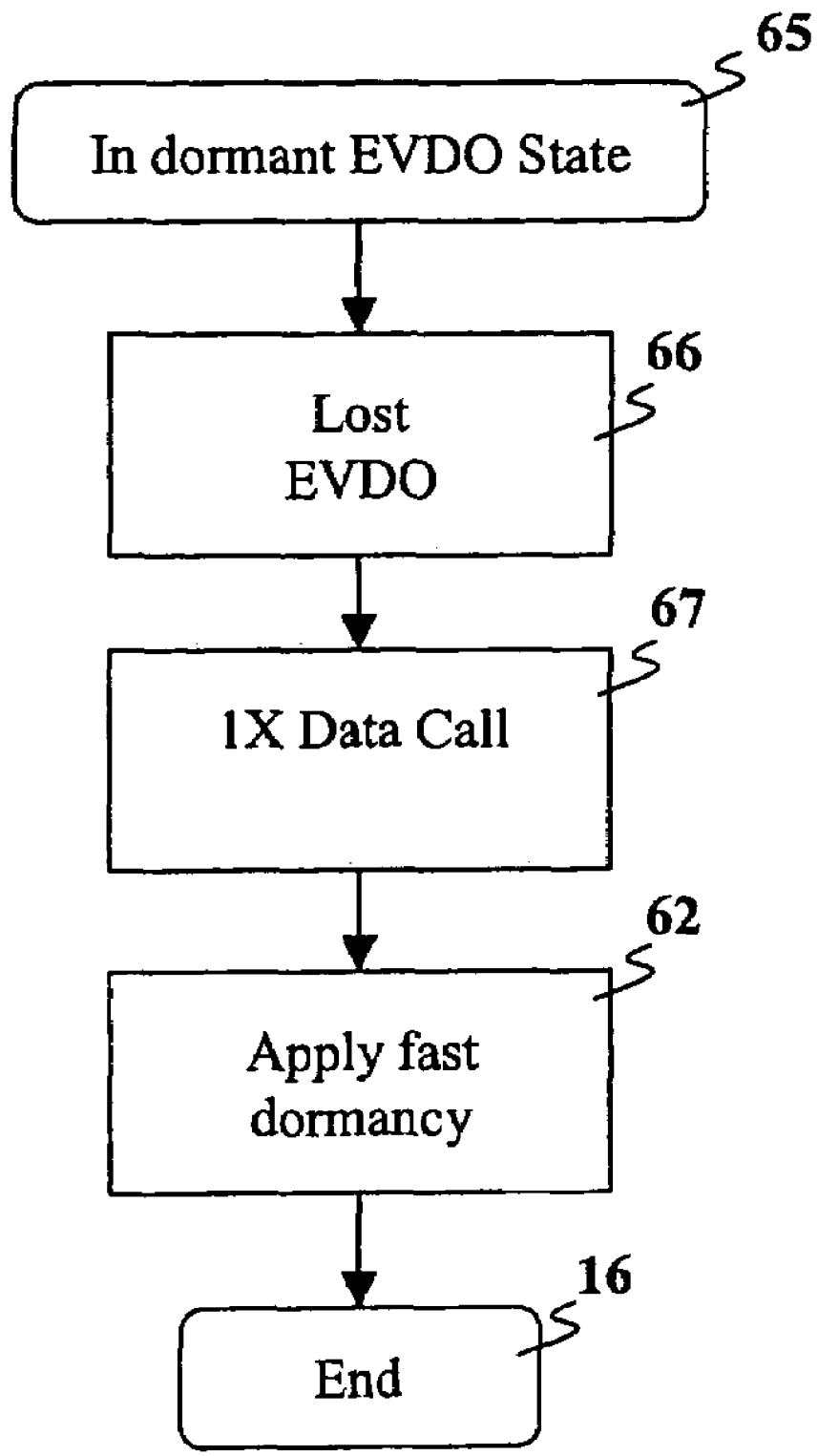
FIG. 5 is a flow chart of method to improve battery life on a hybrid access terminal that has lost an EVDO state.

Referring to FIG. 5, a hybrid access terminal is a dormant EVDO state 65 and in step 66 loses EVDO. In step 66 the hybrid access terminal moves the data session to 1X.

Once the transition occurs and the data call is ended the hybrid access terminal proceeds to step 62 in which fast dormancy is applied. Thus the hybrid access terminal moves more quickly into its dormant state in step 62.

The hybrid access terminal next moves to step 16 in which the process ends.

The above four solutions therefore provide for better battery life on the hybrid access terminal and in most cases above, also provide for the blocking of redundant data calls to the network from the hybrid access terminal, thus also saving network resources. As will be appreciated, the above four solutions can be used individually or, in one preferred embodiment, two or more of the above four ways of saving battery life and reducing redundant calls can be combined.

Figure 8:
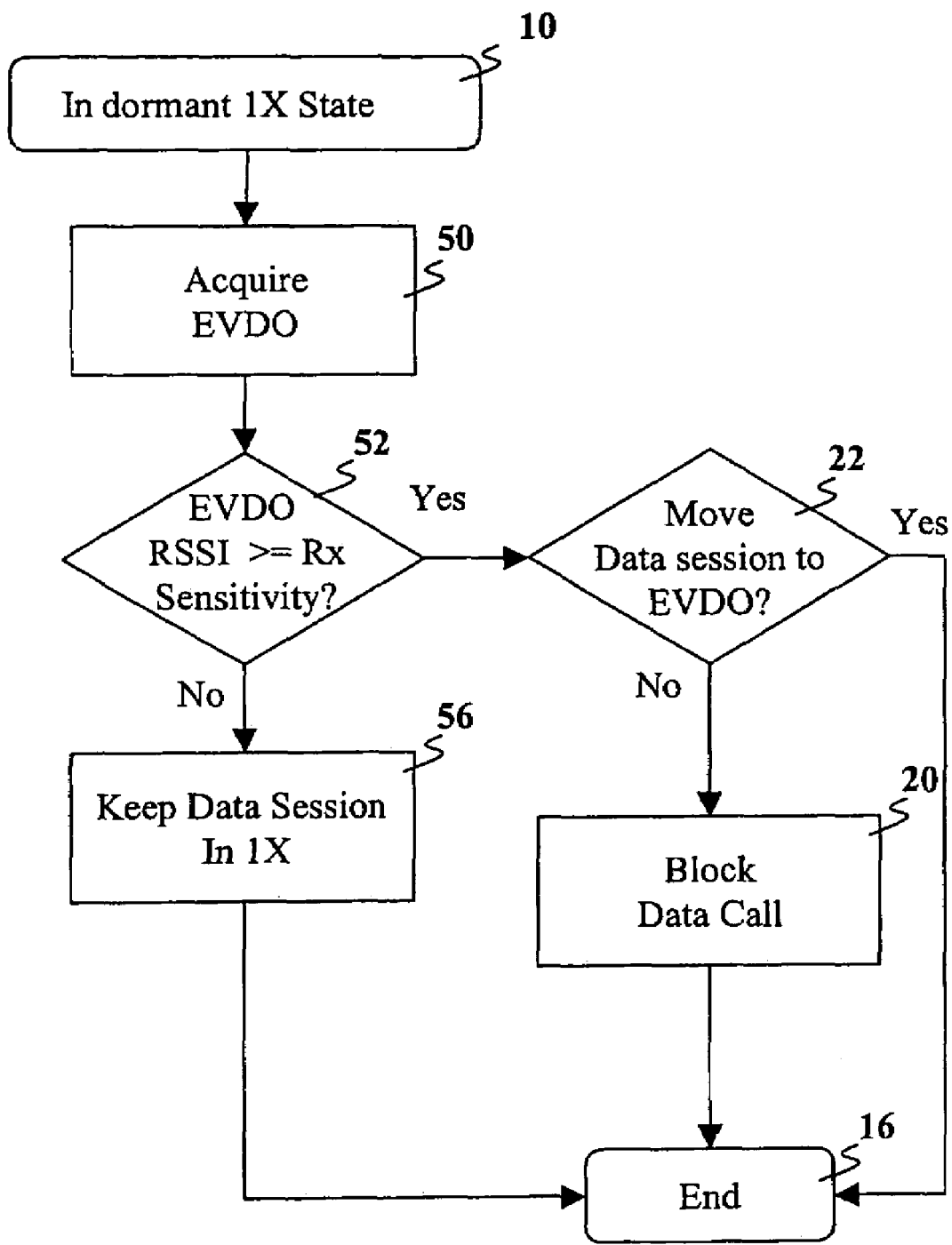
FIG. 8 is a flow chart showing a combination of the methods of FIG. 1 and FIG. 3.

Reference is now made to FIG. 8. FIG. 8 shows a combination of the signal threshold method and the redundant call blocking method. Specifically, a hybrid access terminal is in dormant 1X state 10 and detects an EVDO signal in and acquires the EVDO system in step 50.

In step 52 the hybrid access terminal checks whether the EVDO RSSI is greater than or equal to the receiver sensitivity and if not the hybrid access terminal proceeds to step 56 in which it keeps the data session in 1X and then ends in step 16.

Conversely, if the EVDO RSSI is greater than or equal to the receiver sensitivity, the hybrid access terminal can proceed to step 22 in which it attempts to move the data session to EVDO. The hybrid access terminal then proceeds to step 20 in which it blocks the redundant data call. From step 22 if the data session move to EVDO attempt is successful or from step 20 the hybrid access terminal next proceeds to step 16 in which the process is ended.

Figure 9:
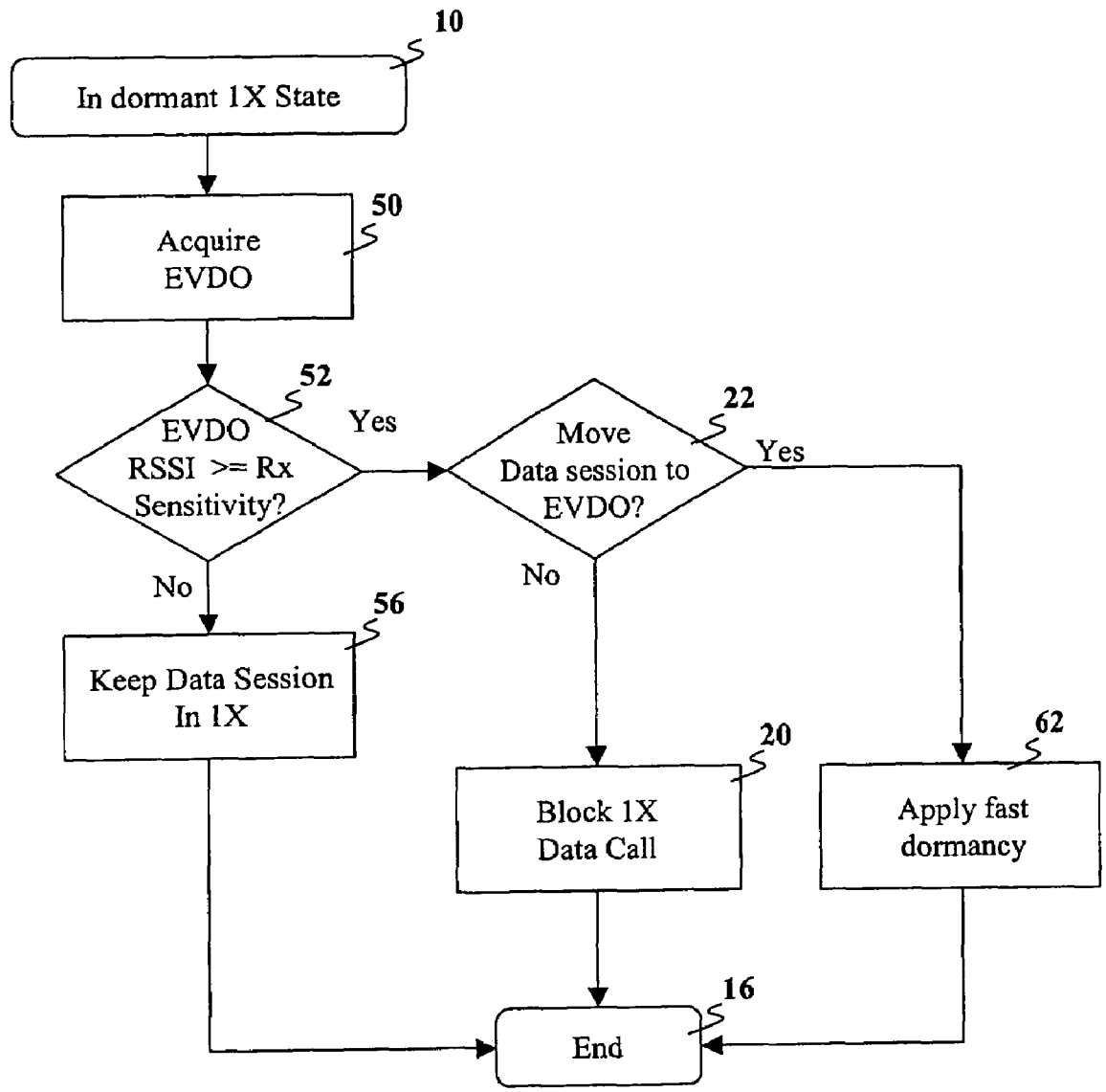
FIG. 9 is a flow chart showing a combination of the methods of FIGS. 1, 3 and 4.

Referring to FIG. 9, FIG. 9 illustrates a combination of the call blocking, signal threshold and fast dormancy methods. Specifically, a hybrid access terminal is in state 10 and in step 50 detects an EVDO signal and acquires the EVDO system. In step 52 it checks to see whether the EVDO RSSI is greater than or equal to the receiver sensitivity and if no, the hybrid access terminal proceeds to step 56 in which the data session stays in the 1X system. The hybrid access terminal proceeds to step 16 in which the process is ended.

Conversely, if the threshold is greater than or equal to the receiver sensitivity then the hybrid access terminal proceeds to step 22 in which it attempts move the data session to the EVDO system and checks if this was successful.

If the data session was successfully moved to EVDO, the hybrid access terminal can apply fast dormancy in step 62 and the process in step 16.

Conversely, if the data session move to EVDO was not successful, then the hybrid access terminal can proceed to step 20 in which the data call is blocked. The hybrid access terminal then proceeds to step 16 in which the process is ended.

Figure 10:
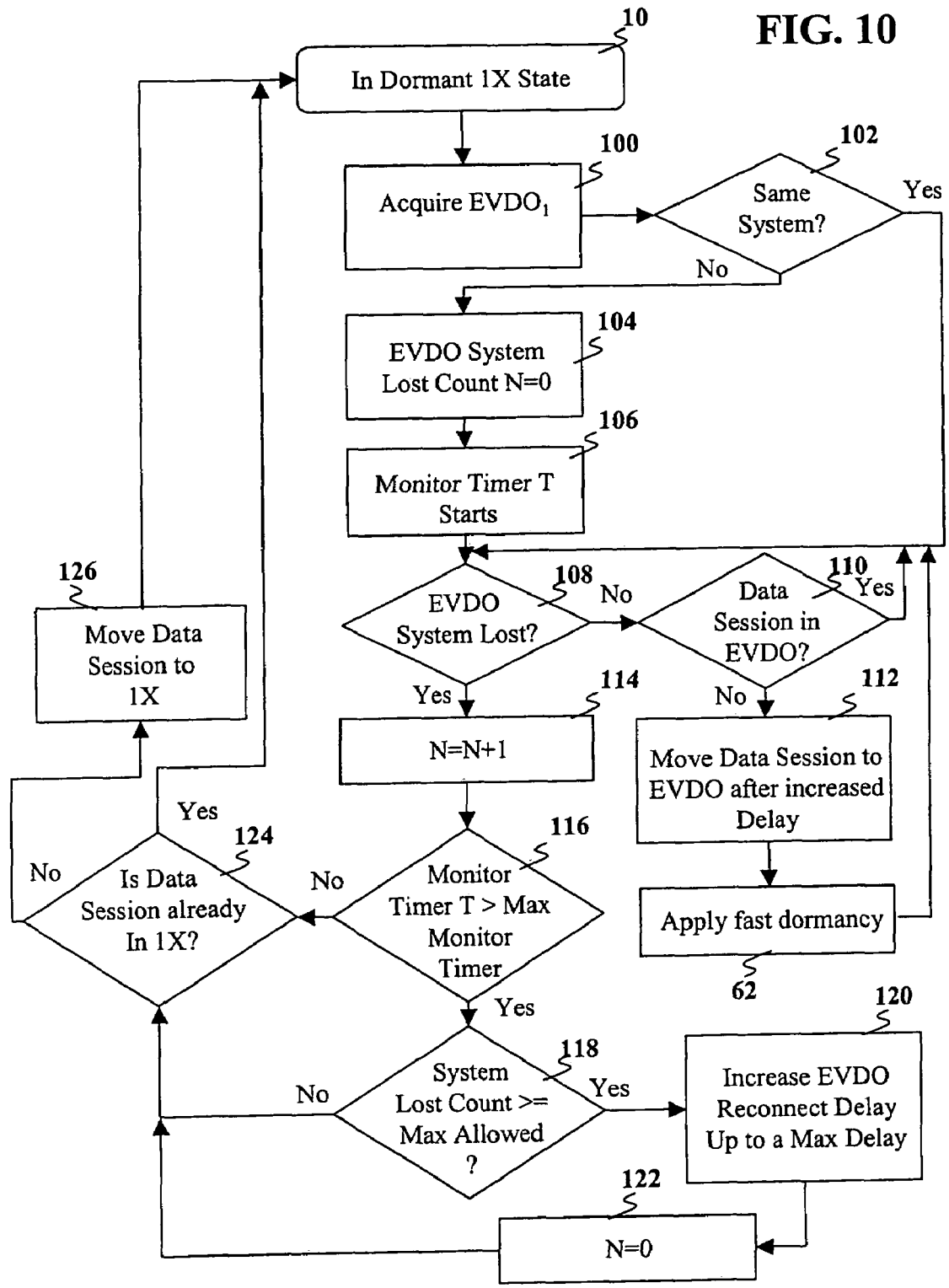
FIG. 10 is a flow chart showing a combination of the methods of FIGS. 7 and 4.

Reference is now made to FIG. 10. FIG. 10 shows a combination of the call blocking method, the fast dormancy method and the radio frequency environment checking method. Specifically, FIG. 10 is identical to the method of FIG. 7 with the exception that from step 112 if the data session is moved to EVDO, the hybrid access terminal proceeds to step 62 in which fast dormancy is applied and then to step 108 in which a check is made to see if the system is lost.

Figure 11:
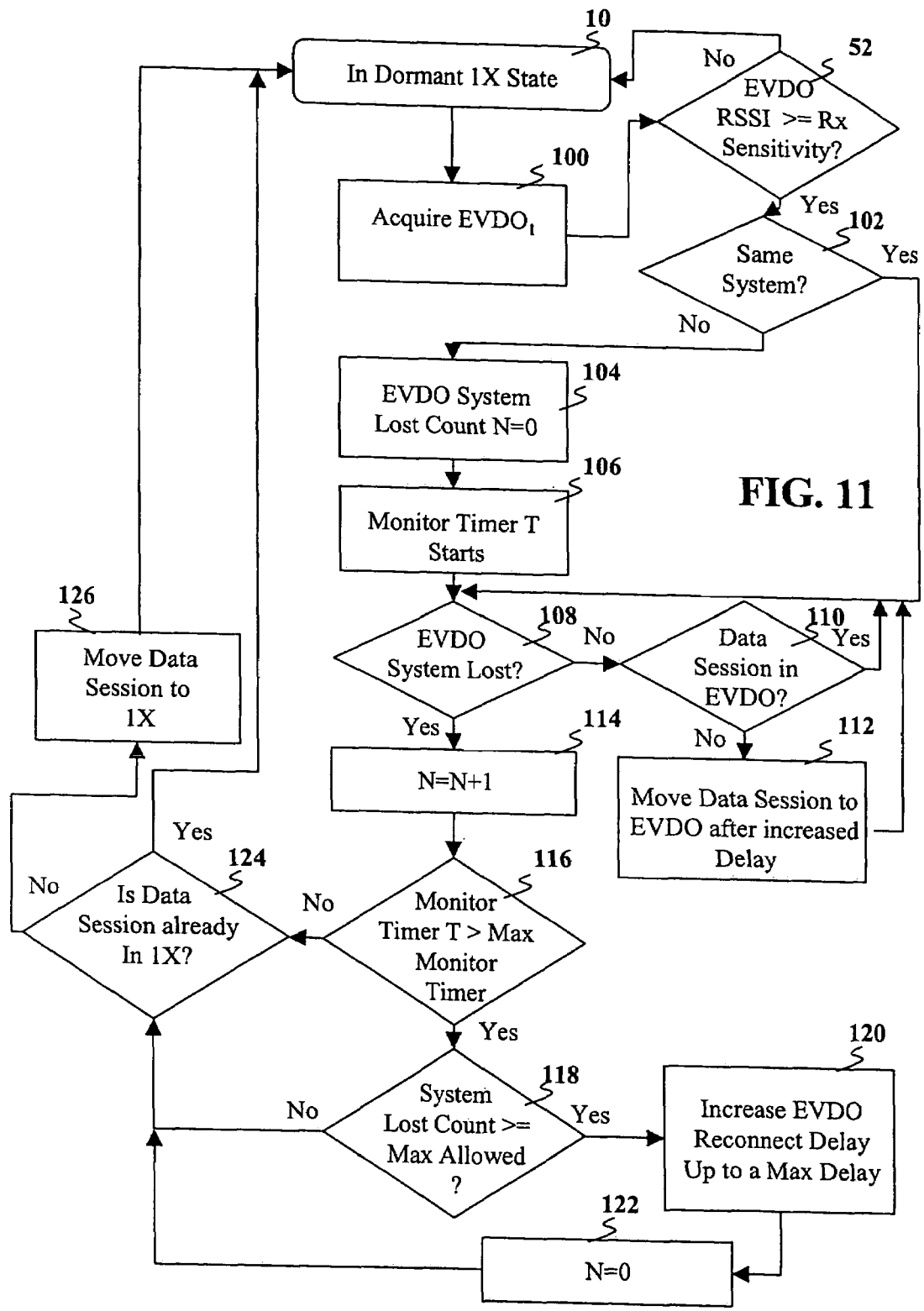
FIG. 11 is flow chart showing a combination of the methods of FIGS. 3 and 6.

Reference is now made to FIG. 11. FIG. 11 shows the combination of the radio frequency environment method and the threshold method. In this case, the hybrid access terminal is in state 10 and in step 100 detects that there is an EVDO signal. In step 52 the hybrid access terminal checks to see whether the EVDO RSSI is greater than or equal to the receiver sensitivity. If yes, the hybrid access terminal proceeds to step 102 in which checks whether the same system is being acquired. The method proceeds according to the method of FIG. 7 after this.

Conversely, if the check in step 52 does not find that the EVDO RSSI is greater than or equal to the receiver sensitivity, the hybrid access terminal proceeds to a dormant 1X state 10.

Figure 12:
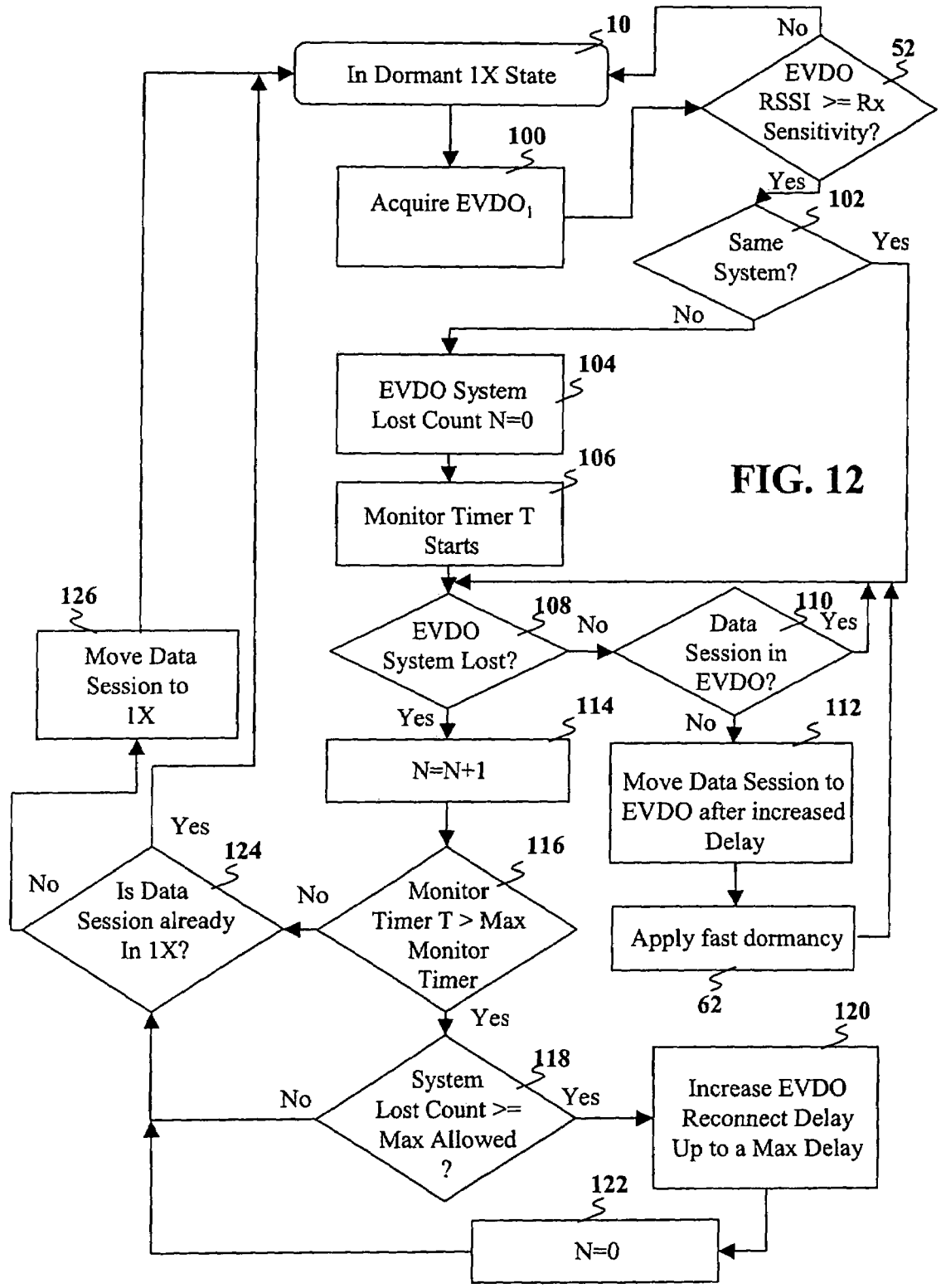
FIG. 12 is a flow chart showing a combination of the methods of FIGS. 1, 3, 4 and 6.

Reference is now made to FIG. 12. As will be appreciated, all three of the above solutions, along with the fast dormancy, can be combined. This is identical to FIG. 11 with the exception that once the hybrid access terminal moves the data session to EVDO in step 112, it next proceeds to step 62 in which fast dormancy is applied.

Various other combinations of the above four methods could also be used and the above is not meant to limit the above to any particular combinations.

Figure 13:
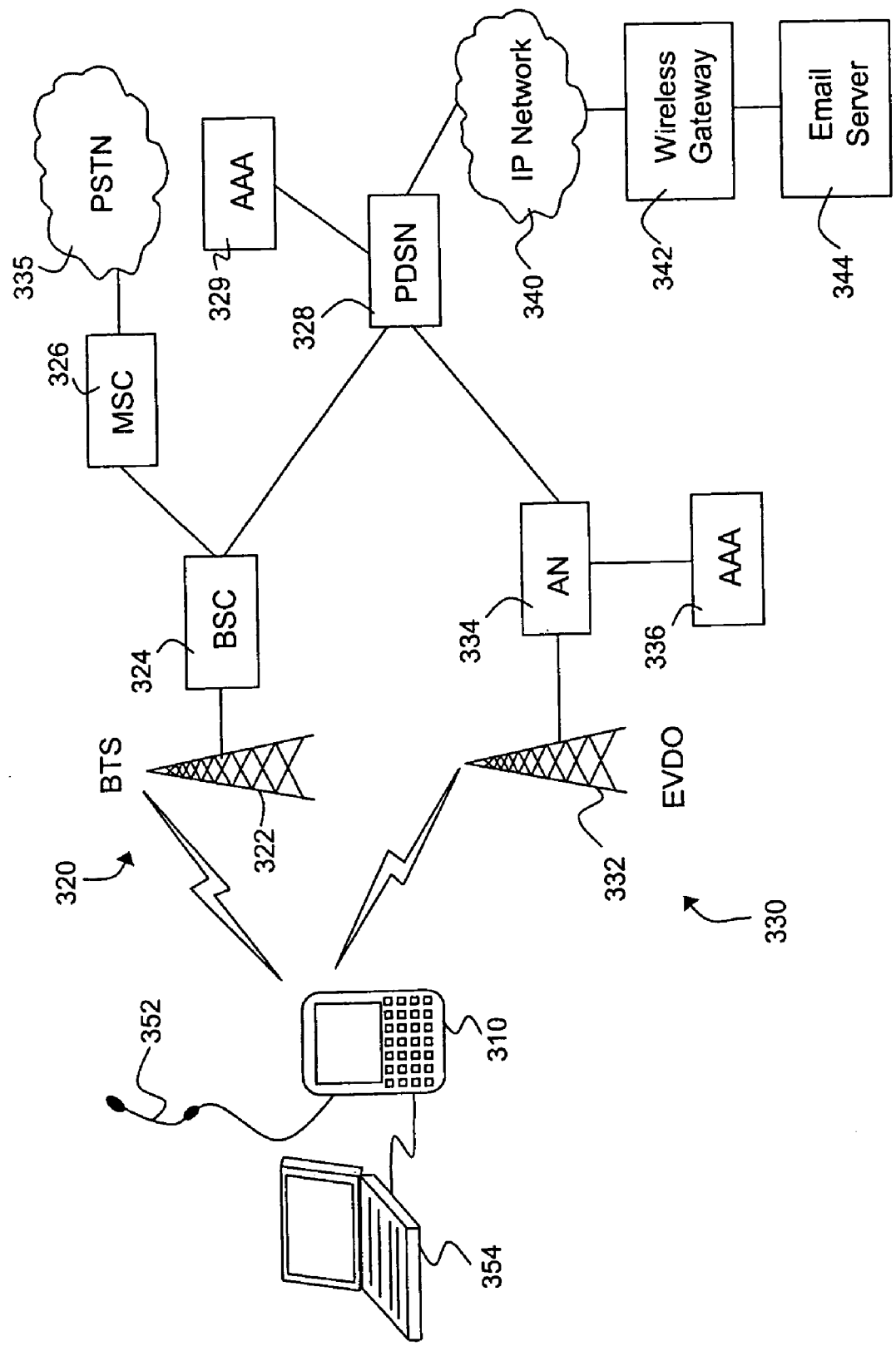
FIG. 13 shows an exemplary network in which the above methods can be implemented.

Reference is now made to FIG. 13. FIG. 13 is a block diagram of an exemplary wireless data network in accordance with the present application and with which the various embodiments of the method of the instant application may cooperate. FIG. 13 shows a block diagram of a wireless data device 310 and exemplary CDMA 1x network 320, an exemplary EVDO network 330, a public switched telephone network (PSTN) 335, a data network 340, wireless gateway 342 and e-mail server 344 with which the instant techniques of this application may cooperate. The wireless data device 310 is preferably a two-way communication device having data and voice communication capabilities.

CDMA network 320 is comprised of a base transceiver station (BTS) 322 and a base station controller (BSC) 324. Base station controller 324 communicates with a mobile switching centre 326 which as will be appreciated, is a circuit switched only component communicating with PSTN 335. Base station controller 324 further communicates with a packet data serving node (PDSN) 328 which is a packet switched only component. PDSN 328 further communicates with IP network 340.

EVDO network 330 contains an EVDO sector 332, which communicates with access node (AN) 334. Since the EVDO network 330 is a data only network, access node 334 communicates only with PDSN 328 and not with any circuit switch components.

An authentication, authorization and accounting node 336 is associated with AN 334, and a similar node 329 is associated with PDSN 328.

Operationally, hybrid access terminal 310 communicates wirelessly with CDMA network 320 using BTS 322 and BSC 324 to gain access to the CDMA 1x network. As indicated above, the CDMA 1x network is given priority and the establishment of the CDMA network occurs prior to any EVDO network connection being established.

Hybrid access terminal 310 sends and receives both data and voice services through CDMA network 320 until an EVDO network connection with established. Base station controller 324 communicates with circuit switch services provided by MSC 326 such as voice and short message service (SMS) via PSTN 335.

Prior to an EVDO connection being established, hybrid access terminal 310 further communicates wirelessly with BTS 322 and BSC 324 to gain access to packet data services provided by PDSN 328, such as e-mail, wireless application protocol (WAP) and other data services via data network 340. Such services are provided through wireless gateway 342 and servers such as e-mail server 344.

Once a network connection is established with CDMA 1x network 320 and the hybrid access terminal enters CDMA 1x idle state, wireless device 310 establishes a connection with EVDO network 330. This is done through EVDO sector 332 and AN 334. In this way, hybrid access terminal 310 gains access to packet data services provided by PDSN 328 using EVDO network 330. Subsequent to the establishment of an EVDO network connection with hybrid access terminal 310, CDMA network 320 is used to provide circuit switched services such as voice and SMS while EVDO network 330 is used to provide packet data services such as e-mail and WAP.

As will be appreciated by those skilled in the art, wireless device 310 can include voice communication means such as a headpiece 352 or a user can communicate directly into the wireless device 310.

A further advantage of the present system is that due to high transfer rates associated with EVDO networks, wireless device 310 can be used as a wireless modem and be connected through various means such as a USB or other serial port, or by short range wireless communications with a computer 354. Computer 354 can then gain access to data network 340 through EVDO network 330 using hybrid access terminal 310 as the modem.

Figure 14:
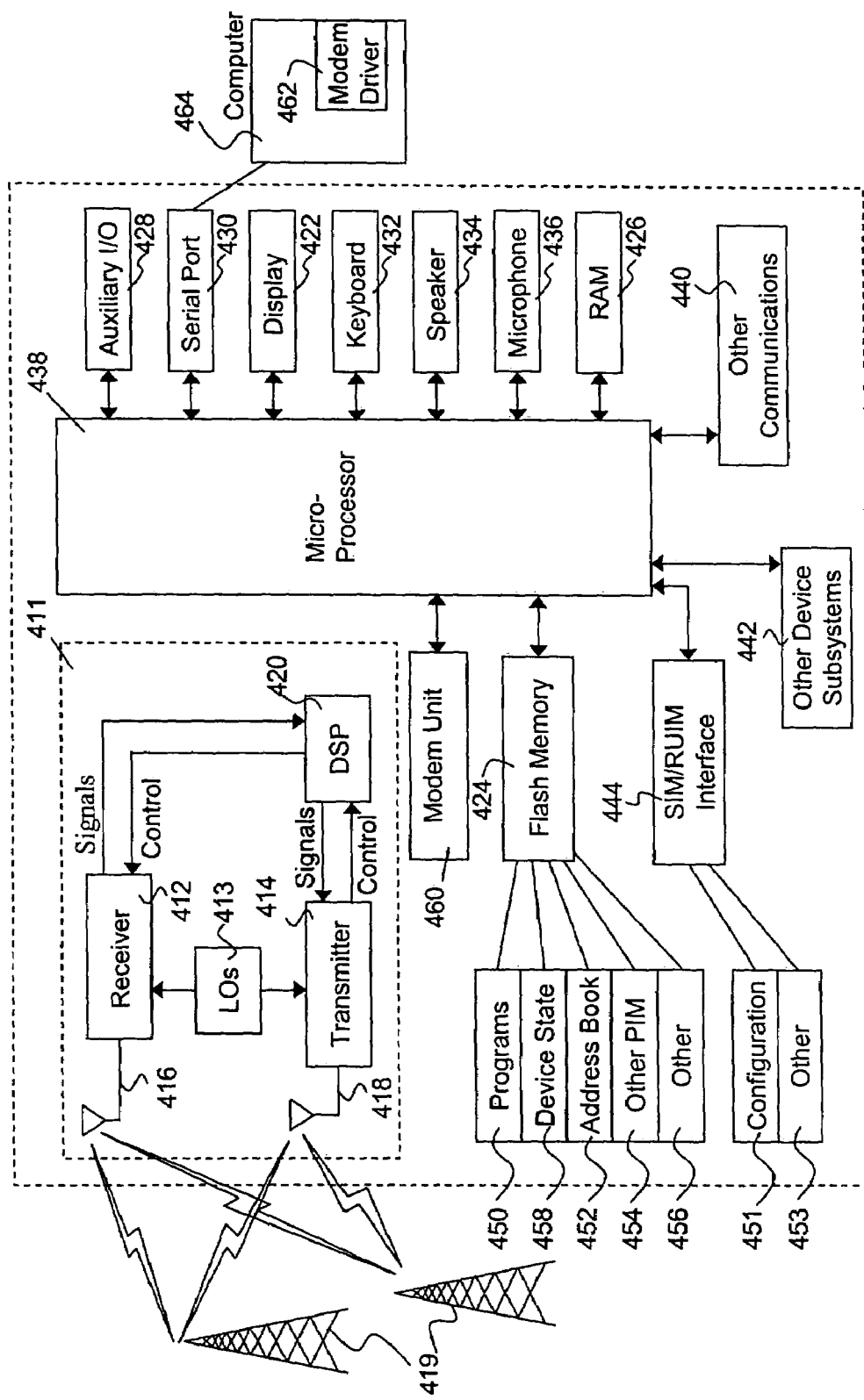
FIG. 14 is an exemplary hybrid access terminal that can be used in accordance with the present methods.

Reference is now made to FIG. 14. FIG. 14 is a block diagram illustrating a hybrid access terminal apt to be used with preferred embodiments of the apparatus and method of the present application. Hybrid access terminal 400 is preferably a two-way wireless communication device having at least voice and data communication capabilities. Hybrid access terminal 400 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where hybrid access terminal 400 is enabled for two-way communication, it will incorporate a communication subsystem 411, including both a receiver 412 and a transmitter 414, as well as associated components such as one or more, preferably embedded or internal, antenna elements 416 and 418, local oscillators (LOs) 413, and a processing module such as a digital signal processor (DSP) 420. As will be apparent to those skilled in the field of communications, the particular design of the communication subsystem 411 will be dependent upon the communication network in which the device is intended to operate. For example, hybrid access terminal 400 may include a communication subsystem 411 designed to operate within the CDMA 1x/EVDO hybrid system.

Network access requirements will also vary depending upon the type of network 419. In some CDMA networks network access is associated with a subscriber or user of hybrid access terminal 400. A CDMA hybrid access terminal may require a removable user identity module (RUIM) or a subscriber identity module (SIM) card in order to operate on a CDMA network. The SIM/RUIM interface 444 is normally similar to a card-slot into which a SIM/RUIM card can be inserted and ejected like a diskette or PCMCIA card. The SIM/RUIM card can have approximately 64K of memory and hold many key configuration 451, and other information 453 such as identification, and subscriber related information.

When required network registration or activation procedures have been completed, hybrid access terminal 400 may send and receive communication signals over the network 419. As illustrated in FIG. 13, network 419 can consist of multiple base stations communicating with the hybrid access terminal. For example, in a CDMA 1x EVDO system, a CDMA base station and an EVDO base station communicate with the hybrid access terminal and the hybrid access terminal is connected to both simultaneously The EVDO and CDMA 1x base stations use different paging slots to communicate with the hybrid access terminal.

Signals received by antenna 416 through communication network 419 are input to receiver 412, which may perform such common receiver functions as signal amplification, frequency down conversion, filtering, channel selection and the like, and in the example system shown in FIG. 14, analog to digital (A/D) conversion. A/D conversion of a received signal allows more complex communication functions such as demodulation and decoding to be performed in the DSP 420. In a similar manner, signals to be transmitted are processed, including modulation and encoding for example, by DSP 420 and input to transmitter 414 for digital to analog conversion, frequency up conversion, filtering, amplification and transmission over the communication network 419 via antenna 418. DSP 420 not only processes communication signals, but also provides for receiver and transmitter control. For example, the gains applied to communication signals in receiver 412 and transmitter 414 may be adaptively controlled through automatic gain control algorithms implemented in DSP 420.

Hybrid access terminal 400 preferably includes a microprocessor 438, which controls the overall operation of the device. Communication functions, including at least data and voice communications, are performed through communication subsystem 411. Microprocessor 438 also interacts with further device subsystems such as the display 422, flash memory 424, random access memory (RAM) 426, auxiliary input/output (I/O) subsystems 428, serial port 430, a keyboard or keypad (or multiple keyboards or keypads) 432, speaker 434, microphone 436, other communication subsystem 440 such as a short-range communications subsystem and any other device subsystems generally designated as 442. Serial port 430 could include a USB port or other port known to those in the art.

Some of the subsystems shown in FIG. 14 perform communication-related functions, whereas other subsystems may provide "resident" or on-device functions. Notably, some subsystems, such as keyboard 432 and display 422, for example, may be used for both communication-related functions, such as entering a text message for transmission over a communication network, and device-resident functions such as a calculator or task list.

Operating system software used by the microprocessor 438 is preferably stored in a persistent store such as flash memory 424, which may instead be a read-only memory (ROM) or similar storage element (not shown). Those skilled in the art will appreciate that the operating system, specific device applications, or parts thereof, may be temporarily loaded into a volatile memory such as RAM 426. Received communication signals may also be stored in RAM 426.

As shown, flash memory 424 can be segregated into different areas for both computer programs 458 and program data storage 450, 452, 454 and 456. These different storage types indicate that each program can allocate a portion of flash memory 424 for their own data storage requirements. Microprocessor 438, in addition to its operating system functions, preferably enables execution of software applications on the hybrid access terminal. These functions include executing the solutions presented above. A predetermined set of applications that control basic operations, including at least data and voice communication applications for example, will normally be installed on hybrid access terminal 400 during manufacturing. A preferred software application may be a personal information manager (PIM) application having the ability to organize and manage data items relating to the user of the hybrid access terminal such as, but not limited to, e-mail, calendar events, voice mails, appointments, and task items. Naturally, one or more memory stores would be available on the hybrid access terminal to facilitate storage of PIM data items. Such PIM application would preferably have the ability to send and receive data items, via the wireless network 419. In a preferred embodiment, the PIM data items are seamlessly integrated, synchronized and updated, via the wireless network 419, with the hybrid access terminal user's corresponding data items stored or associated with a host computer system. Further applications may also be loaded onto the hybrid access terminal 400 through the network 419, an auxiliary I/O subsystem 428, serial port 430, short-range communications subsystem 440 or any other suitable subsystem 442, and installed by a user in the RAM 426 or preferably a non-volatile store (not shown) for execution by the microprocessor 438. Such flexibility in application installation increases the functionality of the device and may provide enhanced on-device functions, communication-related functions, or both. For example, secure communication applications may enable electronic commerce functions and other such financial transactions to be performed using the hybrid access terminal 400.

In a data communication mode, a received signal such as a text message or web page download will be processed by the communication subsystem 411 and input to the microprocessor 438, which preferably further processes the received signal for output to the display 422, or alternatively to an auxiliary I/O device 428. A user of hybrid access terminal 400 may also compose data items such as email messages for example, using the keyboard 432, which is preferably a complete alphanumeric keyboard or telephone-type keypad, in conjunction with the display 422 and possibly an auxiliary I/O device 428. Such composed items may then be transmitted over a communication network through the communication subsystem 411.

For voice communications, overall operation of hybrid access terminal 400 is similar, except that received signals would preferably be output to a speaker 434 and signals for transmission would be generated by a microphone 436. Alternative voice or audio I/O subsystems, such as a voice message recording subsystem, may also be implemented on hybrid access terminal 400. Although voice or audio signal output is preferably accomplished primarily through the speaker 434, display 422 may also be used to provide an indication of the identity of a calling party, the duration of a voice call, or other voice call related information for example.

Serial port 430 in FIG. 14, would normally be implemented in a personal digital assistant (PDA)-type hybrid access terminal for which synchronization with a user's desktop computer (not shown) may be desirable, but is an optional device component. Such a port 430 would enable a user to set preferences through an external device or software application and would extend the capabilities of hybrid access terminal 400 by providing for information or software downloads to hybrid access terminal 400 other than through a wireless communication network. The alternate download path may for example be used to load an encryption key onto the device through a direct and thus reliable and trusted connection to thereby enable secure device communication. As will be appreciated by those skilled in the art, serial port 430 can further be used to connect the hybrid access terminal to a computer to act as a modem. A modem unit 460 interacts with a driver 462 in a computer 464 to allow data transfer through the hybrid access terminal. With EVDO networks, a high rate of data transfer can be achieved using the hybrid access terminal 400 as the modem. Depending on the interface provided by driver 462, unit 460 could be an IP routing module. Further, driver 462 could provide either a modem interface or alternatively an IP interface to computer 464. As will be appreciated by those skilled in the art, the combination of driver 462 and unit 460 must provide a communication interface for computer 430 to be enabled for communications originated and/or terminated at computer 430.

Other communications subsystems 440, such as a short-range communications subsystem, is a further optional component which may provide for communication between hybrid access terminal 400 and different systems or devices, which need not necessarily be similar devices. For example, the subsystem 440 may include an infrared device and associated circuits and components or a Bluetooth™ communication module to provide for communication with similarly enabled systems and devices.

Advantageously, communications originating and/or terminating at computer 464 benefit from the techniques of this application as module 460 preferably uses the techniques taught herein in a manner that is transparent to computer 464.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

We claim:

1. A method in a hybrid access terminal, including a processor and associated memory storing executable computer code, for optimizing transitioning between Evolution Data Only (EVDO) and Code Division Multiple Access (CDMA) 1X systems in a hybrid access terminal comprising the steps of:
   a. executing computer code in the processor to detect a transition between Code Division Multiple Access (CDMA) 1X and EVOLUTION DATA ONLY (EVDO);
   b. executing computer code in the processor to check whether the transition between the CDMA 1X and EVOLUTION DATA ONLY (EVDO) system is successful; and if not,
   c. executing computer code in the processor to block a reconnect data call from the hybrid access terminal.

2. The method of claim 1, wherein the executing computer code in the processor to check step includes:
   a. executing computer code in the processor to store a system identifier, network identifier, and packet zone identifier if connected to a Code Division Multiple Access (CDMA) 1X system or a color code and sector identifier if in an EVOLUTION DATA ONLY (EVDO) system; and
   b. executing computer code in the processor to compare the stored system identifier, network identifier, and packet zone identifier if connected to a Code Division Multiple Access (CDMA) 1X system or a color code and sector identifier if in an EVOLUTION DATA ONLY (EVDO) system with a current system identifier, network identifier, and packet zone identifier if connected to a Code Division Multiple Access (CDMA) 1X system or a color code and sector identifier once a point to point protocol connection is established.

3. The method of claim 2, wherein the executing computer code in the processor to block step includes:
   a. executing computer code in the processor to compare the network currently connected to with a hysteresis table having a list of networks recently connected to; and
   b. if said network currently connected to exists within said hysteresis table, executing computer code in the processor to stop the data call.

4. The method of claim 3, wherein the hysteresis table stores system identifiers, network identifiers, and packet zone identifiers of the list of networks.

5. The method of claim 1, further comprising the steps of, prior to said executing computer code in the processor to detect step:
   a. executing computer code in the processor to sense an EVOLUTION DATA ONLY (EVDO) received signal at the hybrid access terminal;

b. executing computer code in the processor to determine whether an EVOLUTION DATA ONLY (EVDO) received signal strength indication is greater than or equal to a threshold for a predetermined duration; and if yes, c. executing computer code in the processor to allow the hybrid access terminal to connect to the EVOLUTION DATA ONLY (EVDO) system.

6. The method of claim 5, wherein the threshold is set at one of the hybrid access terminal or a network.

7. The method of claim 6, wherein the threshold set by the network is a function of terrain or network capacity.

8. The method of claim 1, further comprising the steps of, prior to said executing computer code in the processor to detect step:

a. executing computer code in the processor to delay a connection timer for connecting to the EVOLUTION DATA ONLY (EVDO) system.

9. The method of claim 8, wherein the executing computer code in the processor to delay step includes:

a. executing computer code in the processor to set a timer value based on received EVOLUTION DATA ONLY (EVDO) signal strength; and b. executing computer code in the processor to decrement the timer if the radio frequency environment is positively changing.

10. The method of claim 9, wherein the executing computer code in the processor to set the timer step further utilizes the number of times connection acquisition has been unsuccessfully attempted within a preset time period to increase or decrease said timer value, wherein said timer value is increased if said system acquisition has been unsuccessfully attempted within the preset time period.

11. The method of claim 5, further comprising the steps of, after said executing computer code in the processor to allow step and prior to said executing computer code in the processor to detect step:

a. executing computer code in the processor to delay a connection timer for connecting to the EVOLUTION DATA ONLY (EVDO) system.

12. The method of claim 1, wherein the executing computer code in the processor to delay step includes:

a. executing computer code in the processor to set a timer value based on received EVOLUTION DATA ONLY (EVDO) signal strength; and b. executing computer code in the processor to decrement the timer if the radio frequency environment is positively changing.

13. The method of claim 12, wherein the executing computer code in the processor to set the timer step further utilizes the number of times connection acquisition has been unsuccessfully attempted within a preset time period to increase or decrease said timer value, wherein said timer value is increased if said system acquisition has been unsuccessfully attempted within the preset time period.

14. The method of claim 1, further comprising the step of executing computer code in the processor to apply fast dormancy to the hybrid access terminal in an EVOLUTION DATA ONLY (EVDO) state.

15. The method of claim 14, wherein a timer for fast dormancy is determined based on statistical analysis of data call terminations.

16. The method of claim 5, further comprising the step of executing computer code in the processor to apply fast dormancy to the hybrid access terminal in an EVOLUTION DATA ONLY (EVDO) state.

17. The method of claim 16, wherein a timer for fast dormancy is determined based on statistical analysis of data call terminations.

18. The method of claim 8, further comprising the step of executing computer code in the processor to apply fast dormancy to the hybrid access terminal in an EVOLUTION DATA ONLY (EVDO) state.

19. The method of claim 18, wherein a timer for fast dormancy is determined based on statistical analysis of data call terminations.

20. The method of claim 11, further comprising the step of executing computer code in the processor to apply fast dormancy to the hybrid access terminal in an EVOLUTION DATA ONLY (EVDO) state.

21. The method of claim 20, wherein a timer for fast dormancy is determined based on statistical analysis of data call terminations.

22. A hybrid access terminal adapted for optimizing transitioning between EVOLUTION DATA ONLY (EVDO) and Code Division Multiple Access (CDMA) 1X systems, the hybrid access terminal having a radio subsystem adapted to communicate with a network; a radio processor having a digital signal processor and adapted to interact with said radio subsystem; memory; a user interface; a processor adapted to run user applications and interact with the memory, the radio and the user interface and adapted to run applications, the hybrid access terminal comprising:

a. means for detecting a transition between Code Division Multiple Access (CDMA) 1X and EVOLUTION DATA ONLY (EVDO)

b. means for checking whether the transition between the Code Division Multiple Access (CDMA) 1X and EVOLUTION DATA ONLY (EVDO) system is successful; and c. means for blocking a reconnect data call from the hybrid access terminal if the transition between the Code Division Multiple Access (CDMA) 1X and Evolution Only (EVDO) is not successful.

23. The hybrid access terminal of claim 22, wherein said means for checking includes means for:

a. storing a system identifier, network identifier, and packet zone identifier if connected to a Code Division Multiple Access (CDMA) 1X system or a color code and sector identifier if in an EVOLUTION DATA ONLY (EVDO) system; and b. comparing the stored system identifier, network identifier, and packet zone identifier if connected to a Code Division Multiple Access (CDMA) 1X system or a color code and sector identifier if in an EVOLUTION DATA ONLY (EVDO) system with a current system identifier, network identifier, and packet zone identifier if connected to a Code Division Multiple Access (CDMA) 1X system or a color code and sector identifier once a point to point protocol connection is established.

24. The hybrid access terminal of claim 22, wherein the means for blocking includes means for:

a. comparing the network currently connected to with a hysteresis table having a list of networks recently connected to; and, b. if said network currently connected to exists within said hysteresis table, stopping the data call.

25. The hybrid access terminal of claim 22, wherein the hysteresis table is adapted to store system identifiers, network identifiers, and packet zone identifiers of the list of networks.

26. The hybrid access terminal of claim 22, further characterized by means for:

a. sensing an EVOLUTION DATA ONLY (EVDO) received signal at the hybrid access terminal;
b. determining whether an EVOLUTION DATA ONLY (EVDO) received signal strength indication is greater than or equal to a threshold for a predetermined duration; and if yes
c. allowing the hybrid access terminal to connect to the EVOLUTION DATA ONLY (EVDO) system.

27. The hybrid access terminal of claim 22, further characterized by means for:
a. delaying a connection timer for connecting to the EVOLUTION DATA ONLY (EVDO) system.

28. The hybrid access terminal of claim 27, wherein the means for delaying is adapted to:
a. set a timer value based on received EVOLUTION DATA ONLY (EVDO) signal strength; and
b. decrement the timer if the radio frequency environment is positively changing.

29. The hybrid access terminal of claim 28, wherein the means for delaying, when setting the timer step further is adapted to utilize the number of times connection acquisition has been unsuccessfully attempted within a preset time period to increase or decrease said timer value, wherein said timer value is increased if said system acquisition has been unsuccessfully attempted within the preset time period.

30. The hybrid access terminal of claim 26, further characterized by means for:
a. delaying a connection timer for connecting to the EVOLUTION DATA ONLY (EVDO) system.

31. The hybrid access terminal of claim 30, wherein the means for delaying is adapted to:
a. set a timer value based on received EVOLUTION DATA ONLY (EVDO) signal strength; and
b. decrement the timer if the radio frequency environment is positively changing.

32. The hybrid access terminal of claim 31, wherein the means for delaying, when setting the timer step further is adapted to utilize the number of times connection acquisition has been unsuccessfully attempted within a preset time period to increase or decrease said timer value, wherein said timer value is increased if said system acquisition has been unsuccessfully attempted within the preset time period.

33. The hybrid access terminal of claim 22, further comprising means for applying fast dormancy to the hybrid access terminal in an EVOLUTION DATA ONLY (EVDO) state.

34. The hybrid access terminal of claim 33, wherein a timer for fast dormancy is determined based on statistical analysis of data call terminations.

35. The hybrid access terminal of claim 26, further comprising means for applying fast dormancy to the hybrid access terminal in an EVOLUTION DATA ONLY (EVDO) state.

36. The hybrid access terminal of claim 35, wherein a timer for fast dormancy is determined based on statistical analysis of data call terminations.

37. The hybrid access terminal of claim 27, further comprising means for applying fast dormancy to the hybrid access terminal in an EVOLUTION DATA ONLY (EVDO) state.

38. The hybrid access terminal of claim 37, wherein a timer for fast dormancy is determined based on statistical analysis of data call terminations.

39. The hybrid access terminal of claim 30, further comprising means for applying fast dormancy to the hybrid access terminal in an EVOLUTION DATA ONLY (EVDO) state.

40. The hybrid access terminal of claim 39, wherein a timer for fast dormancy is determined based on statistical analysis of data call terminations.

41. Apparatus for an access terminal operable selectably to communicate with a first network that exhibits first data transfer rate capabilities and with a second network that exhibits second data transfer rate capabilities, said apparatus comprising:
a. a first mechanism configured to attempt establishment of a communication session between the access terminal and the first network;
b. a second mechanism operable responsive to said first mechanism, said second mechanism configured to block generation of a data call between the access terminal and the second network if the attempt by said first mechanism is unsuccessful to establish the communication session between the access terminal and the first network.

* * * * *